United States Patent [19]
Whipple et al.

[11] Patent Number: 5,926,215
[45] Date of Patent: Jul. 20, 1999

[54] FAST READOUT OF A COLOR IMAGE SENSOR

[75] Inventors: William Gregory Whipple, San Diego; Gregory James Martin, Carlsbad, both of Calif.

[73] Assignee: Eastman Kodak Company, Rochester, N.Y.

[21] Appl. No.: 08/733,616

[22] Filed: Oct. 17, 1996

[51] Int. Cl.$^6$ .................................................. H04N 5/335
[52] U.S. Cl. ............................................. 348/280; 348/322
[58] Field of Search ..................................... 348/263, 266, 348/274, 275, 276, 277, 278, 279, 280, 272, 273, 316, 317, 320, 321, 322, 323, 305, 550, 283; 358/513, 512; 257/232; H04N 5/335

[56] References Cited

U.S. PATENT DOCUMENTS

| | | | |
|---|---|---|---|
| 4,802,001 | 1/1989 | Tabei et al. ............................. | 348/280 |
| 4,821,088 | 4/1989 | Tabei et al. ............................. | 348/280 |

*Primary Examiner*—Tuan V. Ho
*Attorney, Agent, or Firm*—William F. Noval

[57] ABSTRACT

In a color image sensor having alternating rows of photosensitive pixels of first and second patterns of spectral sensitivity to one or more of first, second, and third colors, the method of reading out the sensor comprising the steps of:

reading out a group of three sequential rows of pixels, by combining the two rows having pixels of the same pattern of spectral sensitivity into a single read-out row of pixels and dumping the row of pixels having the different pattern of spectral sensitivity; and repeating the readout step until the sensor is completely read out so that sequential readout rows of pixels read out from the sensor have alternating rows of pixels of first and second patterns of spectral sensitivity to one or more of the first, second and third colors, the sensor thereby being read out at a faster frame rate while preserving the color pixel pattern of the sensor.

3 Claims, 3 Drawing Sheets

FAST READOUT OF A COLOR IMAGE SENSOR

FIELD OF INVENTION

This invention relates in general to image sensors and more particularly to a technique for reading out a color image sensor at increased frame rate and increased sensitivity, while using decreased image memory, and preserving the color pixel pattern and effective field of view of the image sensor.

BACKGROUND OF THE INVENTION

Various types of image sensors are commercially available. One type, the full frame sensor, is shown in FIG. 1. The imaging operation of this sensor has an exposure step, a transfer step, and a readout step. The imaging process consists of exposing the sensor 1 over a time period varying from as little as a few hundred nanoseconds to as long as minutes. The photosensitive area 2 of the sensor 1 is represented by triangles. The image transfer step transfers the pixel charge, one row at a time, into the horizontal register, labeled M. The readout step transfers the collected charge in row M, one pixel at a time out of sensor 1 through the floating diffusion 3 and out through the buffer 4 until the row is read out. This line transfer and readout steps repeat until all lines have dumped their charge into row M and then read out. The charge transfer and readout operation requires that the sensor 1 have a shutter or that the transfer be done in the dark, otherwise the image will become smeared as light hitting the sensor 1 will change the image as the transfer operation is in progress.

Another type, the interline transfer image sensor 10, is shown in FIG. 2. Rows 1 through M-1 refer to photosensitive rows. Columns 1–N refer to columns of pixels 12. The triangle symbol represents the photo-active area 14 of the pixel while the shaded part represents a masked transfer charge storage area 16. The imaging operation consists of an exposure period, a transfer operation, and then an image readout operation. The readout operation consists of shifting one line at a time into the adjacent line in the direction of row M, the horizontal register 18. The charge in the horizontal register is transferred out of the sensor pixel by pixel, through the floating diffusion 20 and the output buffer 22.

The interline transfer image sensor of FIG. 2 can be used as a color sensor by the use of a color filter array (CFA) over the photodiodes. Typical color pixel patterns are (where G is green, B is blue, and R is red) GGGB . . . , GGGR . . . in alternate rows with 75% G pixels and 25% B+R pixels, or GRGR . . . , BGBG . . . , in alternate rows with 50% G pixels, 25% B pixels, and 25% R pixels. If such a sensor is operated at a higher frame rate, either the field of view (image height) or maintenance of the color pixel pattern suffers. In such a color interline transfer image sensor, there is thus a need to increase the frame rate and increase sensitivity, while decreasing image memory, preserving the color pixel pattern and maintaining the effective field of view of the imager.

SUMMARY OF THE INVENTION

According to the present invention, there is provided a solution to the needs of the prior art.

According to an aspect of the present invention, there is provided a color image sensor having alternating rows of photosensitive pixels of first and second patterns of spectral sensitivity to one or more of first, second, and third colors, the method of reading out the sensor comprising the steps of:

reading out a group of three sequential rows of pixels, by combining the two rows having pixels of the same pattern of spectral sensitivity into a single read-out row of pixels and dumping the row of pixels having the different pattern of spectral sensitivity; and repeating the readout step until the sensor is completely read out so that sequential readout rows of pixels read out from the sensor have alternating rows of pixels of first and second patterns of spectral sensitivity to one or more of the first, second and third colors, the sensor thereby being read out at a faster frame rate while preserving the color pixel pattern of the sensor.

ADVANTAGEOUS EFFECT OF THE INVENTION

The present invention has the following advantages.

1. A color image sensor can be read out at faster frame rates and at increased sensitivity while maintaining the color pixel pattern and effective field of view of the image sensor.

2. The image memory can be made smaller or a larger number of images can be stored.

DESCRIPTION OF THE PREFERRED EMBODIMENTS

Figure 1:
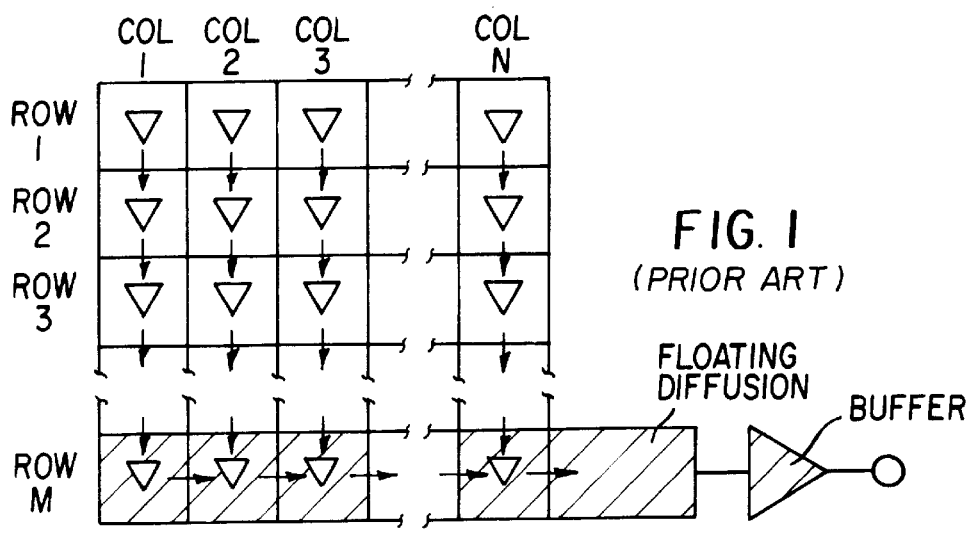
FIG. 1 is a diagrammatic view of a full frame image sensor.
Figure 2:
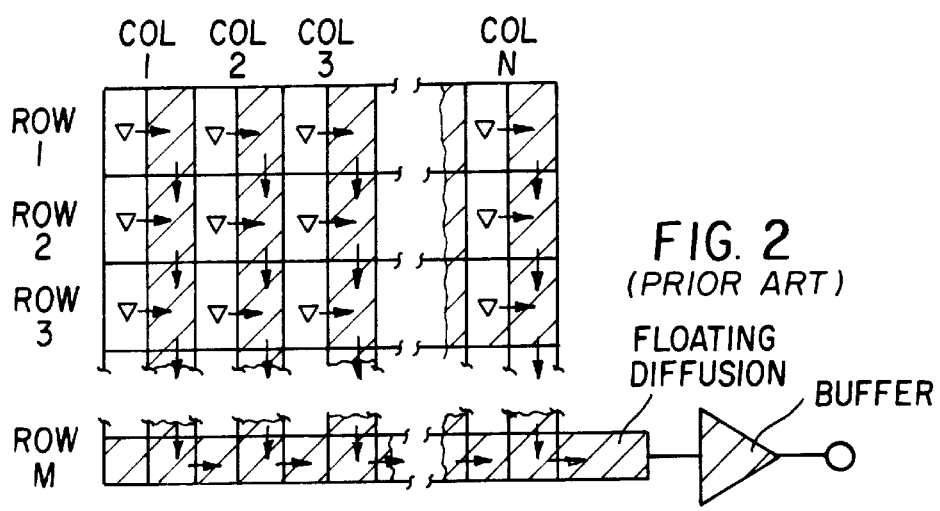
FIG. 2 is a diagrammatic view of an interline transfer image sensor.
Figure 4:
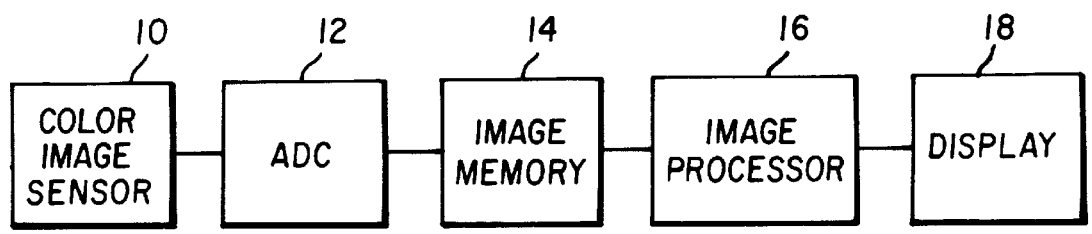
FIG. 4 is a block diagram of an imaging system including the present invention.

Broadly, the present invention is directed to color image sensors which can be read out at increased frame rates and increased sensitivity while preserving the color pixel pattern of the sensor and maintaining the effective field of view. FIG. 4 is a block diagram of an imaging system including a color image sensor. As shown, a color image 10 produces an analog color image signal which is digitized by ADC (analog-to-digital converter) 12. The unprocessed digital color image is stored in memory 14. Processor 16 processes a digital color image by sizing and color matrix algorithms and the processed color image is displayed on display 18.

Figure 3:
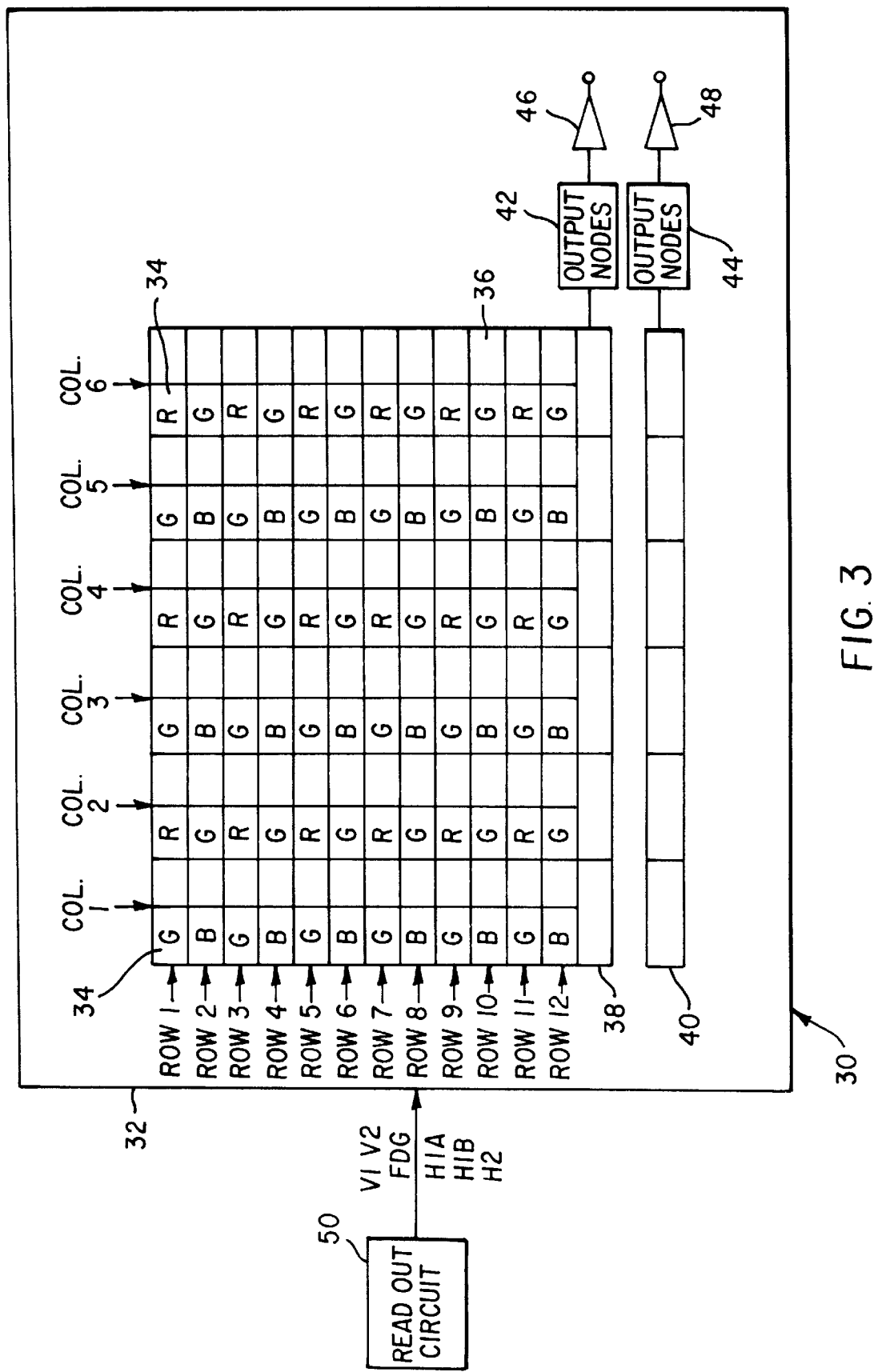
FIG. 3 is a diagrammatic view of a color image sensor according to the present invention.

FIG. 3 shows an interline color image sensor according to the present invention. The sensor shown is in simplified form to better illustrate the invention. Thus, although 12 rows and 6 columns of photosensitive pixels are shown, it will be understood that sensors having much larger arrays of pixels can be used. For example, the KA1-0310 and KA1-1001 interline CCD Image Sensors supplied by the Eastman Kodak Company, Rochester, N.Y., have 648×484 and 1024× 1024 pixels arrays, respectively.

As shown in FIG. 4, color image sensor 30 includes a substrate 32, a plurality of photosensitive pixels (photodiodes) 34 arranged in an array of m(12) rows and n(6) columns. Pixels 34 are arranged in alternating rows of photosensitive pixels of first and second patterns (GRGRGR, BGBGBG) of spectral sensitivity to one or more of first, second, and third colors (R-Red, G-Green, B-Blue). Sensor 30 has n(6) vertical shift registers (CCD) 36, horizontal shift registers (CCD) 38,40, output nodes 42,44, and buffer amplifiers 46,48.

Readout circuit 50 provides clocking signals to sensor 30 to control readout of an acquired image. Signals V1 and V2 cause transfer of charges accumulated in photosensitive pixels 34 to vertical shift registers 36 and from vertical shift registers to horizontal shift register 38. FDG signal causes a row of pixels to be dumped to substrate 32. H1A, H1B and H2 clock horizontal registers 38,40.

According to the present invention, every third row of pixels is flushed from the vertical CCD registers 36 into the substrate 32 (rather than clocked into the horizontal shift register 38). This is accomplished by using the Fast Dump Gate (FDG) signal from circuit 50. Also, the remaining line pairs are binned vertically (i.e. charge combined) when clocked into the horizontal shift register 38. The overall effect of the above operations is to: preserve the spatial ordering of the pattern; double the light sensitivity; reduce by approximately ½ the time it takes to read the captured image out of the image sensor; sub-sample over the entire height of the image (rather than just transferring out ⅓ of the image height and flushing the remaining ⅔ of the time, as in splits); reduce the vertical resolution.

Figures 5, 6:
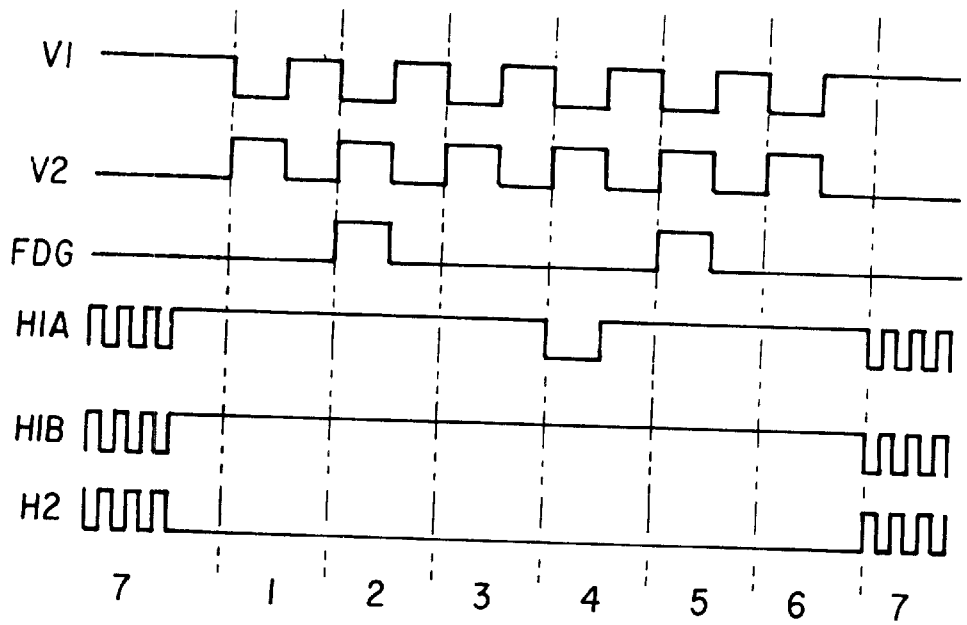
FIG. 5 is a diagrammatic view useful in illustrating the operation of the sensor of FIG. 3.
FIG. 6 is a clocking signal diagram useful in explaining the operation of the sensor of FIG. 3.

With reference to FIGS. 5 and 6, the clocking sequence can be broken down into 7 sub-events (as shown in FIG. 6).

Event 1: Transfer last row (12) from vertical CCD register 36 into first horizontal register 38. This is the BGBGBG row.

Event 2: Dump next row (11) from vertical CCD shift registers 36 into the substrate 32 using the Fast Dump Gate (FDG) signal. This it the GRGRGR row.

Event 3: Transfer next row (10) from the vertical CCD shift registers 60 into the first horizontal register 38 and bin (combine) with the charge that was transferred there during Event 1. This is the binned BGBGBG row.

Event 4: Transfer the next row (9) of charges from the vertical CCD shift registers 36 into the first horizontal register 38 while simultaneously transferring the charge that was in the horizontal register 38 into the second horizontal register 40. Horizontal register 38 now has a row of BRBRBR pixel data. Horizontal register 40 has the binned BGBGBG pixel data.

Event 5: Dump next row (8) from vertical CCD shift registers 36 into the substrate 32 using the Fast Dump Gate (FDG) signal. This is a BGBGBG row.

Event 6: Transfer next row (7) from the vertical CCD shift registers 36 into horizontal register 38 and bin with the charge that was transferred there during Event 4. This is the binned GRGRGR row.

Event 7: Simultaneously shift out the two rows of charge in the horizontal shift registers 38,40 by way of nodes 42,44 and buffer amplifiers 46,48. Upon transferring the data out of the imager 30 (10—FIG. 4), the data is digitized (12) and stored in memory (14). The digitized image is now only ⅓ the size of the full resolution image. This digital image can then be processed (16) via a color interpolation algorithm to generate a full color image. Finally, the image can be interpolated vertically back up to the full size image for display (18).

The invention increases the flexibility in operating a motion analysis type of camera utilizing an interline color filter array color image sensor. That is, an increased variety of clocking modes can be provided for such a camera. Some of the clocking modes might be:

| mode | frame rate | vertical resolution | storage capacity | record time | field of view |
|------|------------|---------------------|------------------|-------------|---------------|
| 1 | normal | full | normal | normal | full |
| 2* | ~2×** | ⅓ | ⅓ | normal | full |
| 3* | normal | ⅓ | normal | 3× | full |
| 4 | ~2×** | full | ⅓ | normal | ⅓ (split) |
| 5 | normal | full | normal | 3× | ⅓ (split) |

*indicates use of new clocking mode described herein.
**the relatively long vertical transfer times reduces the theoretically achievable frame rate of 3× down to about 2× at a 40 MHz pixel clock rate.

Although the invention has been described with respect to particular embodiments thereof, it will be understood that variations and modifications can be effected within the spirit and scope of the invention. For example, color sensors other than interline sensors may be used. The pixel array size of the image sensor can be any size. The color pixel pattern can be any desired pattern.

| Parts List | |
|---|---|
| 10 | color image sensor |
| 12 | analog-to-digital converter |
| 14 | image memory |
| 16 | image processor |
| 18 | display |
| 30 | color image sensor |
| 32 | substrate |
| 34 | photosensitive pixels |
| 36 | vertical shift registers |
| 38 | horizontal shift registers |
| 40 | horizontal shift registers |
| 42 | output nodes |
| 44 | output nodes |
| 46 | buffer amplifiers |
| 48 | buffer amplifiers |
| 50 | readout circuit |

What is claimed is:

1. In a color image sensor having alternating rows of photosensitive pixels of first and second patterns of spectral sensitivity to one or more of first, second, and third colors, the method of reading out said sensor comprising the steps of:

reading out a group of three sequential rows of pixels, by combining the two rows having pixels of the same pattern of spectral sensitivity into a single read-out row of pixels and dumping the row of pixels having the different pattern of spectral sensitivity; and repeating said readout step until said sensor is completely read out so that sequential readout rows of pixels read out from said sensor have alternating rows of pixels of first and second patterns of spectral sensitivity to one or more of said first, second and third colors, said sensor thereby being read out at a faster frame rate while preserving the color pixel pattern of said sensor.

2. The method of claim 1 wherein said reading out step is carried out by transferring the first row of said group of rows into a horizontal register, dumping the second row of said group into the substrate of said color image sensor, transferring the third row of said group into said horizontal register to combine the pixels of said first row with said third row, and reading out said horizontal register as said readout row of pixels.

3. A color image sensor comprising:

a substrate;

a matrix of photosensitive pixels arranged in an array of m rows and n columns and having alternating rows of pixels of first and second patterns of spectral sensitivity to one or more of first, second, and third colors;

n vertical shift registers each located next to a column of said photosensitive pixels;

a horizontal shift register electrically coupled to said n vertical shift registers;

an output circuit connected to said horizontal shift register; and a circuit for reading out said image sensor after it has acquired an image;
- by transferring said acquired image from said matrix of photosensitive pixels to said n vertical shift registers;
- by reading out a group of three sequential rows of pixels, by transferring the first row of said group of rows from said n vertical registers to said horizontal register, by dumping the second row of said group into said substrate, and by transferring the third row of said group into said horizontal register to combine the two rows having pixels of the same pattern of spectral sensitivity into a single row of pixels; and
- by reading out said horizontal shift register to produce a readout row of pixels; and repeating said readout step until said sensor is completely read out so that sequential readout rows of pixels read out from said sensor have alternating rows of pixels of first and second patterns of spectral sensitivity to one or more of said first, second and third colors, said sensor thereby being read out at a faster frame rate while preserving the color pixel pattern of said sensor.

\* \* \* \* \*